United States Patent [19]

Policelli

[11] Patent Number: 4,875,717
[45] Date of Patent: Oct. 24, 1989

[54] END CONNECTORS FOR FILAMENT WOUND TUBES

[75] Inventor: Frederick J. Policelli, Salt Lake City, Utah

[73] Assignee: Hercules Incorporated, Wilmington, Del.

[21] Appl. No.: 15,825

[22] Filed: Feb. 17, 1987

[51] Int. Cl.⁴ .................................................. F16L 39/02
[52] U.S. Cl. ................................ 285/149; 285/250; 138/109; 29/157 R
[58] Field of Search ............... 285/149, 250, 246, 387, 285/55, 384, 353, 334; 138/109; 29/157 R

[56] References Cited

U.S. PATENT DOCUMENTS

| | | | |
|---|---|---|---|
| 1,954,989 | 4/1934 | Eastman | 285/84 |
| 2,044,335 | 6/1936 | Schulthess | 285/250 |
| 2,462,323 | 2/1949 | Hurst | 285/250 |
| 2,809,056 | 10/1957 | Kaiser | 285/149 |
| 3,118,691 | 1/1964 | Press | 285/149 |
| 3,373,243 | 3/1968 | Janowiak et al. | 174/89 |
| 4,126,157 | 11/1978 | Roest | 138/109 |
| 4,143,892 | 3/1979 | Murphy et al. | 285/149 |
| 4,275,769 | 1/1981 | Cooke | 138/109 |
| 4,530,379 | 7/1985 | Policelli | 138/109 |
| 4,548,428 | 10/1985 | Ruhle | 285/353 X |

FOREIGN PATENT DOCUMENTS 1277682  1/1961  France ................... 285/149

*Primary Examiner*—Thomas F. Callaghan
*Attorney, Agent, or Firm*—David Edwards; Edmund C. Ross, Jr.

[57] ABSTRACT

End connectors of filament wound tubes are disclosed. The end connector uses an upset region at an end of the filament wound tube as a base for mounting a threaded ring around the tube. The ring is threaded to a sleeve mounted also around this upset region. The sleeve threads to a coupling on the other side of the upset region. The coupling carries means for connecting the filament wound tube to another body. In forming the end connector, the sleeve and coupling are assembled about the upset region and the ring, assembled on the body of the filament wound tube on the other side of the upset, is threaded to the sleeve.

6 Claims, 1 Drawing Sheet

END CONNECTORS FOR FILAMENT WOUND TUBES

BACKGROUND OF THE INVENTION

1. Field of Use

This invention relates to filament winding and, more particularly, to filament wound tubes that are connectable with each other. This invention, still more particularly, relates to connecting tubes that are adapted to transmit torsional as well as radial and axial forces and, accordingly, are useful in oil field drilling pipe, drive shafts for transmitting rotary power and suspension components for heavy ground vehicles.

Filament winding is a well known technique for making composite tubes using high strength filaments such as carbon (graphite) fiber and thermosetting resin. Compared to tubes made of metal such as steel, the resultant filament wound tubes are considerably lighter in weight, have equivalent strength and generally have better fatigue resistance. Moreover, the filament wound tubes advantageously do not corrode.

When a composite tube is to be used in a torque transmitting application, however, the tube needs to be connected to another body in a manner enabling torque transmission. A variety of connectors have been proposed in the prior art for this purpose including, for example, the use of rivets, pins and the like which are inserted through holes drilled in the pipe.

Cutting holes in a composite tube is not always advantageous. For example, in oil field drilling pipe, the tube needs to be impermeable to highly pressurized fluids and effective sealing of the holes in the pipe is difficult. Moreover, when significant torsional and bending loads are applied to the tubes having such pins, rivets and the like, these fasteners undergo significant loads and may break or otherwise cause excessive wear around the holes in the composite tube.

The use of an upset region at the end of a filament wound tube has also been disclosed in the prior art. See, also, U.S. Ser. No. 843,425 filed Mar. 24, 1986 now U.S. Pat. No. 4,813,715 in the name of F. J. Policelli which is herein incorporated by reference. The instant tube is different than the tube in said U.S. Ser. No. 843,425 in its use of round outer surfaces on its connecting composite ends.

2. Objects of the Invention

It is an object of this invention to provide a low cost, high performance connecting tube that has a highly reliable means for connection.

It is an object of this invention to provide a connecting composite tube which can transmit very high torsional forces in addition to high axial forces and internal pressure.

It is an object of this invention to provide a connecting tube for use in applications such as oil field drilling pipe, shafts that transmit rotary power and suspension components for heavy ground vehicles wherein the connecting tube has a joint with a diameter that is minimized through connecting members whose strength is optimized.

BRIEF SUMMARY OF THE INVENTION

A hollow, connecting tube having a tube axis that extends centrally within the tube along the length thereof, the tube comprising a filament wound tubular body having a longitudinal axis that is coincident with the tube axis, the tube body having (a) an end section, a body section and a ramp section that is between the end section and the body section wherein filaments of the tubular body are high strength and extend from the end section through the ramp section to a location within the body section remote from the ramp section, (b) inner dimensions that are larger in the end and ramp sections than in the body section, the ramp section having inner dimensions increasing along the longitudinal axis toward of the end section and (c) outer dimensions that are larger in the end and ramp sections than in the body section, the ramp section having outer dimensions increasing along the longitudinal axis toward the end section. Connecting members of the tube comprise: a threaded ring having (a) an outer surface with a threaded portion and a gripping portion and (b) an inner surface with a sliding portion and a ramp portion, the sliding portion being beneath that part of the threaded portion adjacent the gripping portion and the ramp portion being beneath that portion of the threaded portion remote from the gripping portion; a cylindrical coupling having inner dimensions corresponding substantially to the inner dimensions of the filament wound body and comprising (a) an insertable portion adapted to fit within the tubular body beneath the end and ramp sections, (b) an end portion adapted for connecting the tube to another through coupling means carried integrally by the end portion and (c) a middle portion between the insertable and end portions along the tube axis, the middle portion having a threaded portion around an outer surface thereof, this threaded portion having an outer dimension that is greater than the inner dimension of the end section; and a sleeve having (a) a first integrally threaded end that is adapted to thread to the coupling around the middle portion thereof, (b) a second integrally threaded end that is adapted to thread to the ring around the threaded portion thereof and (c) a smooth middle portion between the first and second integrally threaded ends that is adapted to slide over the end section of the tubular body.

The inner surface configuration of the end section of the tubular body and the outer surface configuration of the insertable portion of the coupling preferably fit together through mating polygonal configurations. This arrangement permits high levels of torque to be transmitted through the cylindrical coupling to the filament wound tubular body. In embodiments of the connecting tube that are used as oil field drilling pipes, the connecting tube comprises a liner within the tubular body on the inside surface thereof.

DETAILED DESCRIPTION OF PREFERRED EMBODIMENTS

Figure 1:
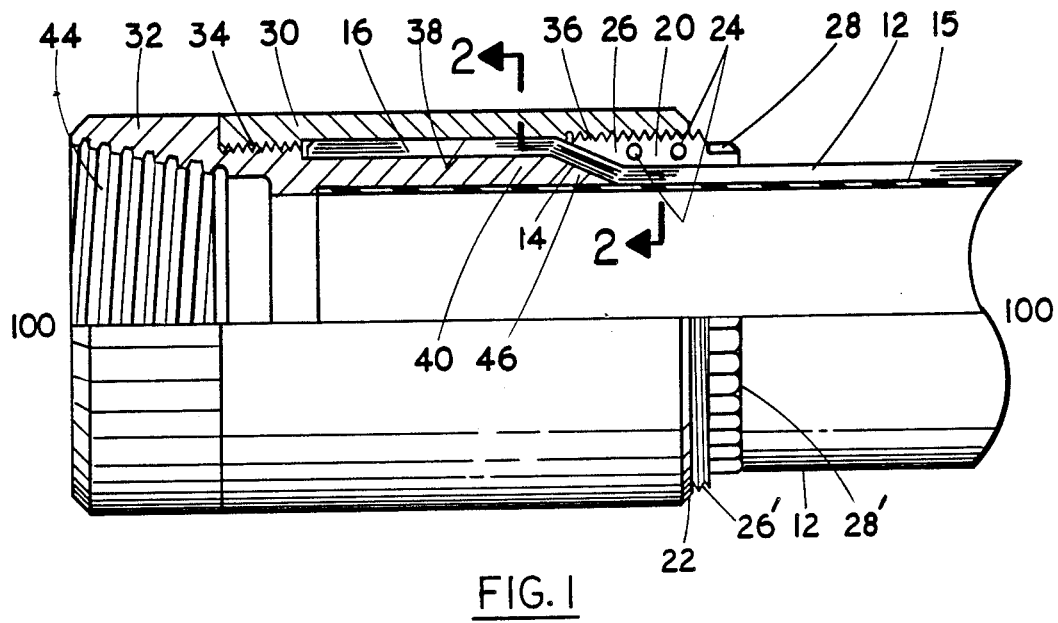
FIG. 1 shows an end of the connecting tube of this invention. The end is partially in section.

Tube 10 of FIG. 1 has tube axis 100 and is made by steps including winding high strength filaments, e.g. carbon, glass, boron or other similar fiber around a mandrel. The filaments are coated with thermoplastic resin or thermosetting resin (e.g. epoxy or vinyl ester resin) and cured to form the filament wound portions of tube 10. Tube 10 has optional liner 15 made of elastomer or thermoplastic material for sealing fluids within tube 10.

The filament wound portions of tube 10 comprise body section 12, ramp section 14, end section 16 and other end and ramp sections (not shown) at the other end of the tube 10. The winding of body section 12, ramp section 14 and end section 16 is completed in a single operation and filaments preferably extend in tube 10 continuously from end to end. The angle that these filaments lie relative lines parallel to axis 100 of tube 10 determine its axial, bending and torsional resistance as well as burst pressure. The particular angles chosen for winding, accordingly, are a matter of preference except that angles in ramp and end sections 14, 16 will be less than about 80° in a preferred fabricating technique of this invention.

Figure 2:
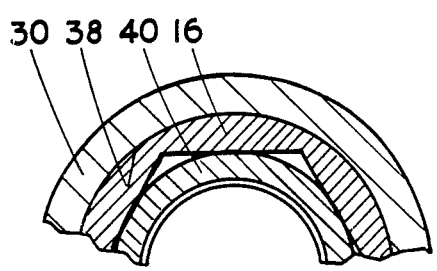
FIG. 2 shows a section of the tube in FIG. 1 taken along 2—2.

Body section 12 is generally cylindrical and has a cross-section which may be circular. End section 16, as shown in FIG. 2, has a cross-section which has a convex polygonal shape on the inside thereof and a circular shape on its outside. Ramp section 14 has the form of a truncated cone in cross-section with a diameter that increases from the diameter of body section 12 to intersect the polygon of end section 16.

The connecting members of tube 10 cooperate together in permitting filament wound tubular body 12 to be connected to another tubular body (not shown) which may also be filament wound. These connecting members comprise a ring (sections 20 and 22 of FIG. 1) internally threaded sleeve 30 and coupling 32. Coupling 32 and sleeve 30 thread together in this cooperation and the split ring, assembled around body section 12, is threaded to the threaded assembly of sleeve 30 and coupling 32. In an alternative embodiment, the ring (20, 22) is integral and not split as shown in FIG. 1. The use of a continuous ring permits use of a sleeve 30 which does not have walls as thick thereby reducing the diameter of the joint. The use of an integral ring, however, requires sliding the ring over the filament wound tube prior to forming an upset region at the end of the tube.

Figure 3:
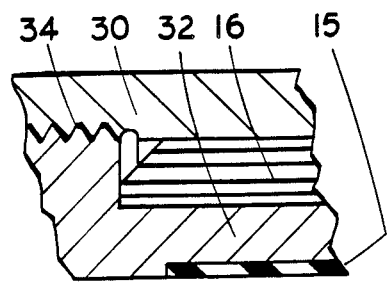
FIG. 3 shows an expanded view of a portion of FIG. 1.

Referring to FIGS. 1, 2 and 3, the various elements of connecting tube 10 are described in greater detail as follows. The ring has two sections which are partially shown as section 20 (partial side elevation) and section 22 (partial top elevation). These sections 20 and 22 fasten together through slightly oversized pins that insert in sockets machined into the side surfaces of sections 20, 22.

For example, section 20 of the split ring fastens to section 22 of the ring through pins (not shown) which fit in sockets 24 in section 20. Other sockets (not shown) in the other side face of section 20, 180° around tube axis 100, recline still other pins (not shown) for connection. The two sections 20, 22 (or more, if desired) when fastened together, form continuous threads around tube axis 100 that include threaded portions 26, 26' of sections 20, 22, a gripping portion that includes grips 28, 28' of sections 20, 22 and inner contours that fit to the outer contours of the body and ramp sections 12 and 14 of tube 10.

Sleeve 30, like coupling 32 and split ring sections 20, 22, may be made of any suitable high strength materials such as steel, titanium and the like. The inside surface of sleeve 30 has first and second threaded ends 34, 36 which are integral and a smooth middle section 38 between these threaded ends. Coupling 32 has insertable portion 40 which fits around the inside of tube 10 beneath ramp and end sections 14, 16. The threaded middle portion of coupling 32 is integral between insertable portion 40 and threads 44. Threads 44 permit joining tube 10 to another body in sealing relation. Ramp insert 46 of insertable portion 40 has a scalloped outer surface with a conical cross section.

The filament wound portion of tube 10 forming body, ramp and end sections 12, 14 and 16 are made on a mandrel having ends contoured like the insertable portion 40 of coupling 32 or in the alternative having ends which are inflatable. These contoured ends of the filament winding mandrel are made by bolting contoured sections around the mandrel axis so that the filaments layed on the mandrel are shaped into ramp and end sections 14, 16 as or in the alternative, after body section 12 is formed. The filament wound tube is cured and the mandrel removed. After machining the ramp and end section areas, the coupling 32 slid into place. The split ring sections 20, 22 are joined around the body section 12 and threaded tightly to sleeve 30 which, in turn, has been previously threaded to coupling 32.

What we claim and desire to protect by Letters Patent is:

1. A hollow, connecting tube having a longitudinal axis that extends centrally within said tube along the length thereof, said tube comprising:

a filament wound tubular body having a longitudinal axis that is coincident with said tube axis, said tubular body having (a) an internally contoured end section for transmission of torque around said tube axis, a body section and a ramp section that is between said end section and said body section wherein filaments of said tubular body are of high strength and extend from said end section through said ramp section to a location within said body section remote from said ramp section, (b) inner dimensions that are larger in said end and ramp sections than in said body section, said ramp section having inner dimensions increasing along said longitudinal axis toward said end section and (c) outer dimensions that are larger in said end and ramp sections than in said body section, said ramp section having outer dimensions increasing along said longitudinal axis toward said end section;

a ring having (a) a outer surface with a threaded portion and a gripping portion and (b) an inner surface with a sliding portion and a ramp portion, said sliding portion being beneath that part of said threaded portion adjacent said gripping portion and said ramp portion being beneath that portion of said threaded portion remote from said gripping portion;

a cylindrical coupling having inner dimensions corresponding substantially to said inner dimensions of said filament wound tubular body and comprising an integral combination of (a) an externally contoured insertable portion adapted to fit within said tubular body beneath said end and ramp sections, wherein said externally contoured insertable portion is contoured to mate with said end and ramp sections within the contours thereof, (b) an end portion adapted for connection of said tube to another through coupling means carried integrally by said end portion and (c) a middle portion between said insertable and end portions along said tube axis, said middle portion having a threaded portion around an outer surface thereof, said threaded portion having an outer dimension that is greater than said inner dimensions of said end section;

a sleeve having (a) a first integrally threaded end that is adapted to thread to said cylindrical coupling around said threads of said middle portion thereof, (b) a second integrally threaded end adapted to thread to said ring around said threaded portion thereof and (c) a smooth middle portion between said first and second threaded ends and adapted to slide over said end section of said tubular body.

2. The hollow connecting tube in accordance with claim 1, wherein said end section has an inner surface configuration that is polygonal and matches an outer surface configuration of said insertable portion.

3. The hollow connecting tube in accordance with claim 2, wherein said end section has an outer surface configuration that is round.

4. The hollow connecting tube in accordance with claim 3, wherein said filaments are selected from carbon graphite, glass, aramid, boron or a combination of two or more of these filaments.

5. The hollow connecting tube in accordance with claim 1, wherein said tube has a liner that extends on the inside surface thereof around said tube axis.

6. A method of making a composite tube having a central longitudinal axis extending the length thereof and comprising continuous filaments in a resin matrix, said method comprising providing a ring having (a) an outer surface with a threaded portion and a gripping portion and (b) an inner surface with a sliding portion and a ramp portion;

providing a filament wound tube having a tube axis coincident with said central longitudinal axis and cured so as to have a body section around which said ring extends with said sliding portion facing inboard, an end section and a ramp section that is between said end and body sections, said body section being larger in length but lesser in diameter than either of said ramp and end sections, the diameter of said ramp section increasing along said tube axis between said body and end sections said end section being internally contoured for transmission of torque around said tube axis;

providing a coupling for connecting said composite tube to another body, said coupling having an insertable portion that fits within said filament wound tube beneath said ramp and end sections, a threaded portion on an outside surface thereof away from said insertable portion being between said insertable portion and threaded means for connecting said composite tube to another body;

providing a sleeve having first and second threaded ends on an inside surface thereof, said sleeve adapted to mount around said end section such that said first and second threaded ends are spaced on either side thereof;

mounting said sleeve around said filament wound tube such that said threaded ends thereof are on either side of said end section;

inserting said coupling into said filament wound tube up to said threaded surface portion thereof while causing relative rotation thereof with said sleeve thereby threading said sleeve and said coupling together;

causing relative rotation of said ring in said sleeve so as to thread together said sleeve and said ring thereby providing said connecting composite tube.

* * * * *